CONTAINER FILLING APPARATUS

Original Filed Oct. 15, 1970 4 Sheets-Sheet 1

INVENTOR
KENNETH F. M. FRIENDSHIP
BY Greist, Lockwood, Greenawalt & Dewey
ATT'YS.

CONTAINER FILLING APPARATUS

Original Filed Oct. 15, 1970 4 Sheets-Sheet 2

INVENTOR
KENNETH F.M. FRIENDSHIP
BY Reid, Lockwood, Dennewitz + Dewey
ATT'YS.

CONTAINER FILLING APPARATUS

Original Filed Oct. 15, 1970 4 Sheets-Sheet 3

INVENTOR

KENNETH F.M. FRIENDSHIP

BY Dreist, Goldsmith, Greenawalt & Dewey

ATT'YS.

CONTAINER FILLING APPARATUS

Original Filed Oct. 15, 1970 4 Sheets-Sheet 4

INVENTOR
KENNETH F. M. FRIENDSHIP
BY Trist, Lockwood, Greenwald & Denny
ATT'YS.

United States Patent Office

Re. 28,275
Reissued Dec. 17, 1974

28,275

CONTAINER FILLING APPARATUS

Kenneth F. M. Friendship, Hinsdale, Ill., assignor to Continental Can Company, Inc., New York, N.Y.

Original No. 3,720,242, dated Mar. 13, 1973, Ser. No. 80,895, Oct. 15, 1970. Application for reissue Mar. 23, 1973, Ser. No. 344,129

Int. Cl. B67c *3/06*

U.S. Cl. 141—6 31 Claims

Matter enclosed in heavy brackets [ ] appears in the original patent but forms no part of this reissue specification; matter printed in italics indicates the additions made by reissue.

ABSTRACT OF THE DISCLOSURE

An apparatus for filling carbonated liquids into containers which is characterized by a tubular housing with a downwardly opening upper member in which a lower member is mounted in slidingly telescoping relation. The lower member has a container top engaging and sealing bell on the bottom end and houses a hollow fluid product distributor in which there is a product control valve depending from an air operated piston which is slidable in the lower housing member above said product distributor. A valve controlled counterpressure line is connected to a side wall inlet port which leads to a space between the piston and the product distributor and which connects with passageways leading through the product control valve and into the container. A cam operated valve controlled product supply line is connected to an inlet port in the lower housing member and through a passageway in the product distributor to a recess in which the product control valve operates. A light compression spring normally holds the product valve closed and the product also exerts closing pressure on the valve when the product line is opened until counterpressure operating on the valve piston overcomes the combined pressure of the spring and product and opens the valve. A probe associated with the valve operates a relay circuit when a predetermined level of fill is reached and opens the air pressure line for closing the product valve while the counterpressure line is closed by cam operation of its control valve. A flow restrictor device is placed in the product supply line immediately adjacent the inlet port for producing extreme turbulence and high pressure drop in the liquid which minimizes foaming.

This invention relates to the filling of containers with liquid products and is more particularly concerned with improvements in an apparatus for filling containers in a substantially automatic manner with a uniform quantity of a beverage or similar liquid product.

Machines have heretofore been developed which are particularly designed for packaging carbonated beverages and similar products. These machines provide for a build-up of counterpressure in the container, by one means or another, and flowing in the product under a low manometric head from a receiver incorporated in the machine in which a product supply is maintained at pressure similar to the counterpressure in the container, the low head pressure being relied upon to minimize foaming normally caused by high velocity flow or mechanical handling. These machines are based on the assumption that the handling of this type product gently and at low velocities avoids foaming and such machines have had limited filling speeds. Automatic filling machines for this purpose have been employed which have generally included a product supply vessel or bowl with a plurality of filling heads incorporated in the bottom wall and arranged to draw the product directly from the supply vessel and feed the desired amount thereof downwardly through a valve and into the containers while counterpressure and product pressure are maintained substantially equal. Generally, it has been necessary to provide for exhausting gas from the head space by a special venting valve or "snifting" device prior to breaking the seal with the container top when the container has been filled with the desired amount of the product. Also, the need for maintaining a relatively large supply of product under pressure in the machine has complicated the problems of preserving the quality of the product, maintaining sanitary conditions and minimizing product loss when shut-down or change of product is required. More recently, it was found that by raising the product pressure and including a flow restricting device in the product valve so as to create a pressure drop between the elevated pressure of the product and atmospheric pressure when the desired flow through the valve was achieved, carbonated products could be handled with a lesser degree of foaming and at a higher filling speed. It was felt that the flow restricting device should be of a character to produce a thin film of liquid, on the order of 0.005 in. to 0.006 in. thick, and the terms "Laminar" and "Capillary" flow have been frequently used in describing the flow condition produced for successful operation of such devices. These devices have been used commercially, particularly in conjunction with vending machines for carbonated products and similar dispensing equipment.

It is a general object of the present invention to provide an improved system or apparatus for filling containers with liquid products which is capable of substantially automatic operation, with minimum control, and which will achieve uniform filling at high filling speeds, particularly, when handling beverage products of a carbonated nature.

It is a more specific object of the invention to provide an apparatus, particularly designed for filling containers with carbonated beverage products, which is capable of high speed operation and which will fill the containers with uniform amounts of the product and with a minimum of foaming.

Another object of the invention is to provide an apparatus for filling containers with a liquid product which is carbonated wherein the product is delivered to a filling head which had a product flow control valve and a means for providing counterpressure in a container sealed to the head and wherein means is provided in the product delivery line, which is external of the head, for creating extreme turbulence and high presure drop in the product line so that it flows through the product control valve at relatively high filling speed and little or no foaming results.

A further object of the invention is to provide an apparatus for filling containers with a carbonated liquid product wherein a filling head is provided in which there is incorporated a product flow control means including a valve and associated structure which enables counterpressure to be delivered through the valve and built up in a container having its mouth sealed to the head, with the product flow control valve being operable to admit a liquid product which has passed through a restrictor device prior to entering the filling head and which restrictor device is not required to produce laminar flow of the product for filling without excessive foaming.

Another object of the invention is to provide a filling head for beverages or similar carbonated products which normally tend to foam when submited to turbulence caused by rough handling or high velocity flow wherein the product is supplied to the filling head through a pressurized line in which line there is provided a restrictor for creating extreme turbulence and boosting the pressure of the product so that when it enters the filling head and flows into the container which has been supplied with a counterpressure forming gas there is a pressure drop which results in filling the container with a minimum of foaming.

Still another object of the invention is to provide a filling head for carbonated beverages which incorporates a product valve with an arrangement for supplying counterpressure through the valve to a container, the mouth of which is sealed to the filling head by a sealing bell, with the counterpressure operative to open the product valve for entry of the product and with means to activate a relay circuit through which the product valve will be closed when a probe triggers the relay upon predetermined rise of liquid in the container to the desired height.

Another object of the invention is to provide a filling head for carbonated beverages which can be easily cleaned and sterilized by in-place cleaning methods.

Another object of the invention is to provide a filling head particularly adapted for handling carbonated beverages wherein a product valve is arranged in the head to control the flow of a product, delivered through a supply line from a source which may be remote from the head, into a container, the mouth of which is sealed for a filling cycle to the bottom end of the head, with the valve operable by a fluid actuated piston and with a connection to a line for supplying counterpressure through the valve, so that, the product valve will be opened by the counterpressure when this is established in the container to fill the container, and with the product valve having an associated probe which activates a relay circuit, the relay being operated automatically, upon the liquid in the container reaching a predetermined level, to supply a fluid to the piston for closing the product valve which cuts off the product flow after which the counterpressure line is closed mechanically.

These and other objects and advantages of the invention will be apparent from a consideration of the filling apparatus which is shown by way of illustration in the accompanying drawings wherein:

Figure 1:
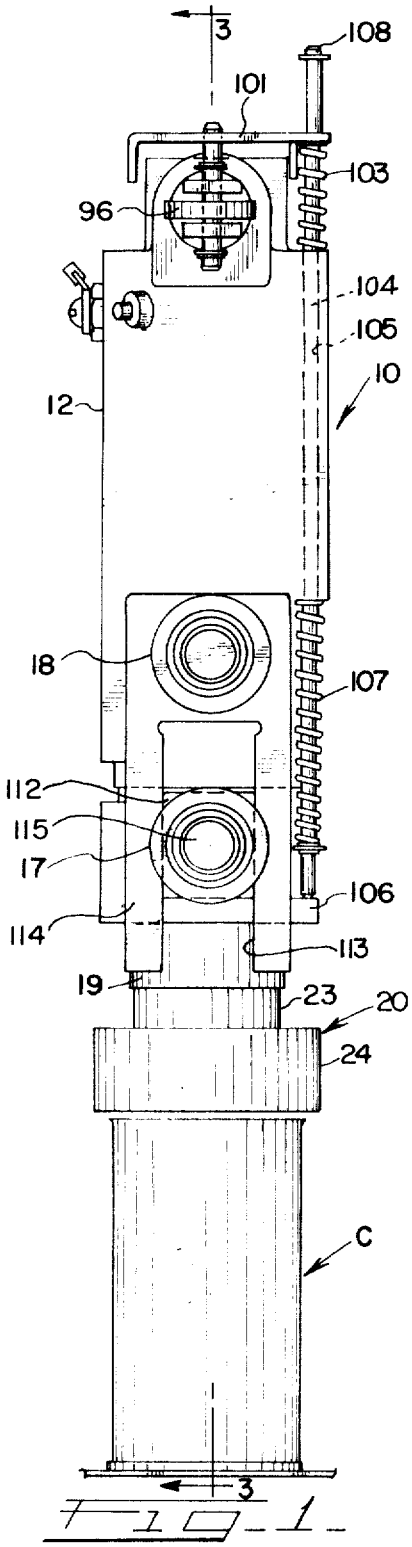
FIG. 1 is a front elevational view showing a filling head mounted on a filling machine for carbonated beverages which has incorporated therein the principal features of the invention.

Referring to the drawings, there is illustrated an apparatus for filling containers, such as cans, with a beverage product, particularly beer, soft drinks or the like, which is carbonated and normally subject to foaming action when exposed to the atmosphere at normal temperatures. The apparatus comprises a filling head 10 which is adapted to be mounted, generally in multiples, on a turret or other conveyor means. The head 10 is illustrated as mounted on a post 11, or the like. The conveyor will have associated supporting means for cans C and a means for delivering the empty cans in approximately vertical alignment beneath each of the filling heads 10.

The head 10 comprises an upper or outer cylindrical member 12 which is in relatively fixed positon on the supporting post 11 and a lower or inner cylindrical member 14 which telescopes partly within the upper member 12 and which is mounted for vertical sliding relation therein. The vertical movement of the inner cylindrical member 14 is controlled by a cam track on a box cam forming member 16 and a cam follower roller 17, the latter being carried on the lower end of the vertically sliding member 14. A cam follower roller 18 on the member 12 also rides in the box cam 16 and serves to relieve pressure on the member 12. The two telescoping members 12 and 14 constitute a two-piece housing for the filling valve and associated elements.

The cylindrical bottom housing member 14 carries at its lower end 19 a combination product guide cone and container top engaging sealing bell assembly 20. A seal ring 21 of rubber, or similar material, is seated in a recess 22 formed in the lower end of the guide cone forming portion 23 and held therein by a flange forming ring 24 in threaded engagement with the guide cone 23. The cone member 23 has its upper end telescoped within and is in threaded engagement with the lower end 19 of the member 14. An O ring seal 25 is seated in a side wall groove near the upper edge of the cone member 23. The interior of the guide cone 23 has the shape of an inverted funnel, as indicated at 26, so as to guide the product into the container C and into engagement with the inner side walls of the container. A cylindrical product distributor member 27 is seated in the lower portion 19 of the member 14 immediately above the top edge of the guide cone member 23 and locked in position by the cone member 23. The bore 28 has an enlarged portion at the lower end which forms a recess 31 for a flange portion 32 on the valve member 30. In the lower face of the flange portion 32 there is mounted an O ring 33 which is seated in a downwardly opening circumferential groove. The O ring is adapted to engage the inner top margin or edge 34 of the guide cone 23 which forms a valve seat for cooperation with the O ring 33. The product distributor 27 has a circumferential groove or slot 35 forming a passageway for receiving product from the product supply line 36. The supply line 36 is connected by the nipple 37 with an entrance passageway 38 extending through the side wall of the housing member 14. Short passageways 40 extend axially downwardly from the circumferential groove 35 into the recess 31 so as to provide for entrance of the product into the guide cone 23 when the valve member 30 is lifted and the valve forming O ring 33 is spaced above the valve seat 34 in a valve opening position. The valve body 30 is provided with a pair of O ring seals 41 and the distributor valve is likewise provided with a pair of O ring seals 42, these seals in each pair thereof being spaced above and below a circumferential groove and the latter being adapted to be positioned to communicate with exhaust passageways 43 and 43' extending through the wall of the distributor member 27 and the housing member 14 in the event there is a failure of the seals.

Figures 3, 4, 4A:
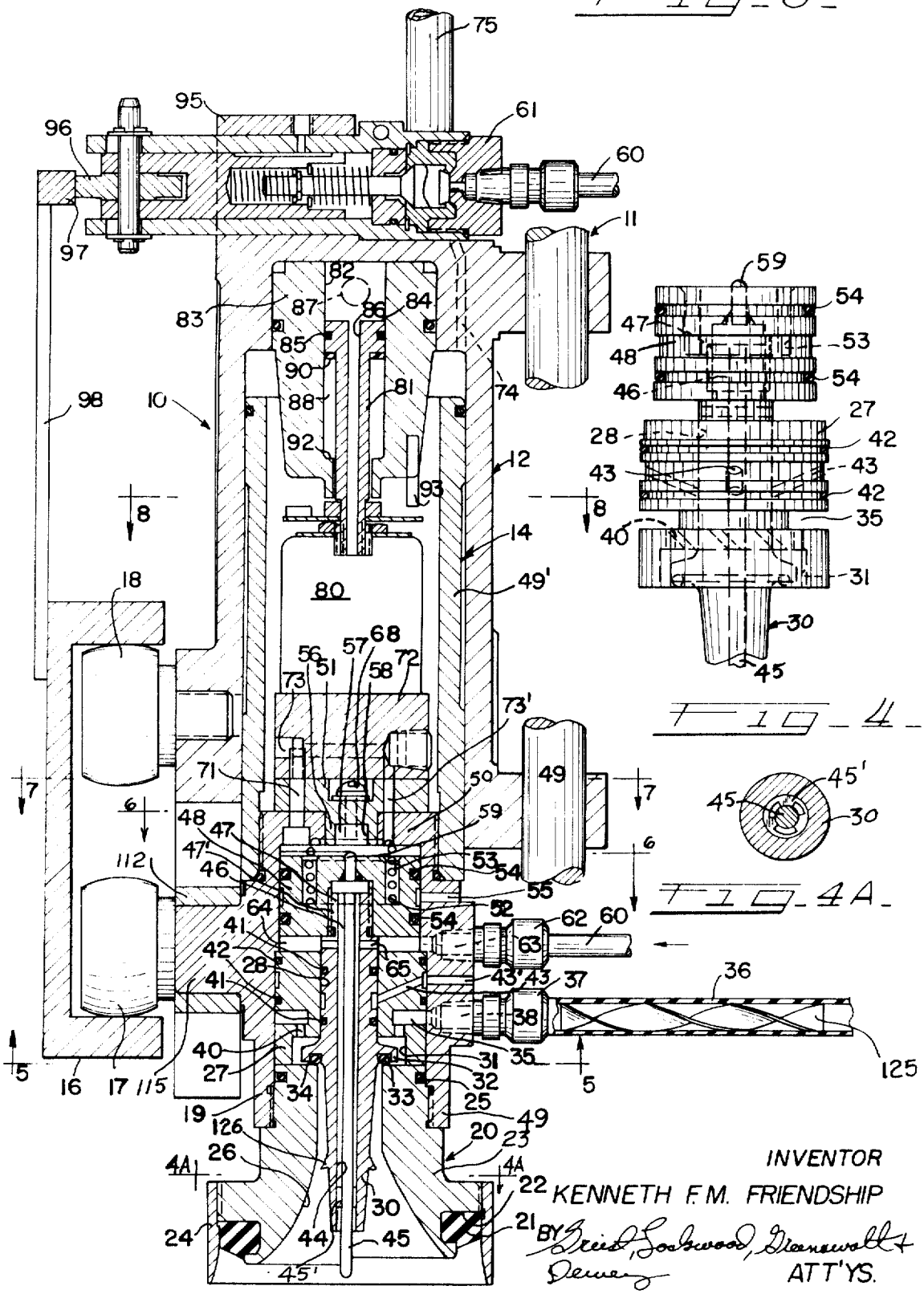
FIG. 3 is a vertical section taken on the line 3—3 of FIG. 1, to an enlarged scale and with portions broken away.
FIG. 4 is an elevational view showing the product valve body and associated parts which are incorporated in the filling head, the view being to a larger scale and showing the assembly removed from its housing, with portions broken away.
FIG. 4A is a fragmentary sectional view, taken on the line 4A—4A of FIG. 3, to a larger scale, showing the probe guide and cleaning fluid restrictor.
Figure 7:
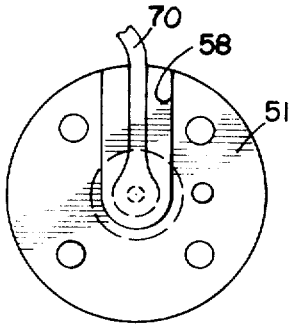
FIG. 7 is a partial cross section taken on the line 7—7 of FIG. 3, to a larger scale and with portions omitted.

The valve member 30 has an axial passageway, or bore, 44 in which there is received a probe 45, the latter being of smaller cross sectional diameter than the bore 44 and being mounted with the lower end in a guide member 45' (FIGS. 3 and 4A) in the bore 44 so as to provide a passageway 46 between the confronting walls of the two members. The valve body 30 has an upper end portion 47 which is seated in threaded engagment in a downwardly opening bore 47' in the bottom end of a piston forming member 48, the latter being received in sliding relation in the upper end of the bottom section 49 of the housing member 14. The housing member 14 is made in two sections, that is, a bottom section 49 and a top section 49' with the top margin of the bottom section 49 being reduced in cross-section and threadedly engaged in the bottom end of the top section 49' so as to function as one member. The bottom section 49 has its top end closed by inwardly extending flange 50 and a cap or plug member 51. A compression spring 52 is seated in an upwardly opening recess 53 in the top face of piston 48 and bears against the bottom face of the flange 50 so as to urge the piston downwardly. The vertical movement of the piston 48 is relatively small, being limited by the vertical movement of the flange 32 which carries the valve seal ring 33 in the recess 31. The piston 48 has a dimension in the direction of the axis of housing 14 which is less than the corresponding dimension of the housing section 49 in which it operates so that there is space between the top and bottom faces thereof and the confronting faces of the flange 50 and the product distributor member 27. The piston 48 has a pair of O ring seals 54 in side wall grooves above and below an exhaust groove which connects with an exhaust passageway 55 in the side wall of the housing section 49 so as to provide an exhaust to the atmosphere in the event of failure of the seals 54. The cap forming member 51, which is fabricated of electrically insulating material, has a plug portion 56 depending in the center hole of the housing section 49 which carries a contact block 57 in a downwardly opening recess 58 in its bottom face. The block 57 is adapted to be contacted by the upper end 59 of the probe 45 when the piston member 48 is raised by a build-up of counter pressure on the bottom face of the piston 48. The counter pressure is delivered through the line 60 from a cam operated control valve 61, with the latter mounted at the top of the housing 12. The delivery line 60 is connected through a nipple 62 with a passageway 63 in the wall of the housing member 49 to the recess 64 between the top of the distributor 27 and the bottom of the piston 48. The recess 64 is connected by passageways 65 with the passageway 46 in the bore 44 of the valve body 30 so as to provide a pathway through the valve body 30 and into the container below the sealing bell assembly 20. When the counter pressure builds up in a container, the top of which is closed by the bell assembly, it exerts a force against the bottom face of the piston 48 which overcomes the force of the spring 52 and the force exerted by the pressure of the product downwardly on the valve 32 and raises the top end 59 of the probe 45 into engagement with the contact block 57. The contact block 57 is held in the insulated cap 51 by contact screw 68 to which lead 70 (FIG. 7) is attached for connecting the same into the electrical circuit controlling the operation of the product valve as hereinafter described.

The contact carrying block 56 is secured on the top of the top flange 51 of the housing section 49 by bolts 71 and a clamp block 72 above the same. A radial passageway 73 extends into the block 72 and connects with an axial passageway 73' which in turn extends downwardly through the contact member 51 and the flange 50 at the top of the housing section 49 so as to provide for passage of compressed air from the open upper end of housing 14 to the top of the piston member 48. A passageway 74 extends through the closed top end of the top housing member 12 and has a connection with a compressed air line 75 enabling the piston 48 to be depressed so as to close the product valve by compressed air the delivery of which is controlled by an electronic relay circuit as hereinafter described.

Figure 8:
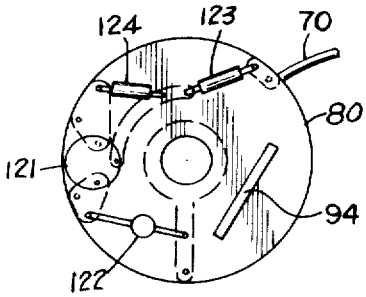
FIG. 8 is a partial cross section taken on the line 8—8 of FIG. 3, to a larger scale and with portions omitted.

A three-way magnetic valve 80 (FIGS. 3 and 8) is carried on the top of the clamp block 72 and a small tubular section 81 is carried on its upper end which extends into an axial bore 82 in an anchor block 83 at the top of the upper housing member 12. The tubular section or member 81 has an upper end forming a head thereon of enlarged diameter 84 which is sealed in sliding relation in the bore 82 by O ring 85 and which moves with the housing member 14 when the head is lowered into engagement with the top of a receptacle C. The axial bore 86 in the member 81 serves to provide a passage for compressed air to escape through a radial port 87 when the piston 48 is raised. The space 88 in the block 83 below the head 84 of the tube 81 provides a built-in air cushion for slowing down the movement of the housing 14 in the event of a burst container. A rubber buffer ring 90 is provided on the lower face of the head portion 84 of the tube member 81 which provides a stop member for engagement with the internal shoulder 92 at the bottom of the recess 88 when the head 84 reaches the bottom of its stroke. A magnet 93 mounted on the bottom of the anchor block 83 serves to open a normally closed reed switch 94 (FIGS. 8 and 12) in the relay circuit when the head 10 is raised to disengage the same from a container C.

Figure 9:
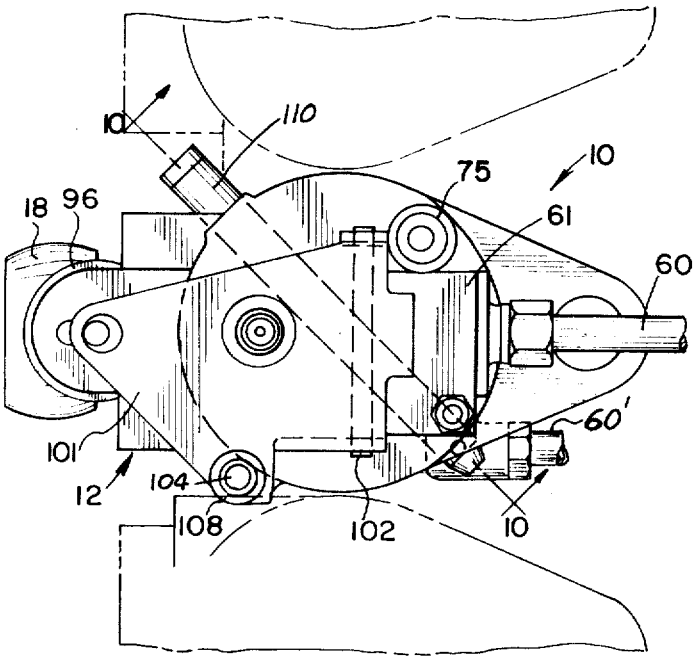
FIG. 9 is a top plan view of the filling head of FIG. 1, with adjacent heads being indicated in phantom line.

The counter pressure valve 61 is mounted in a bracket forming extension 95 (FIG. 3 and 9) on the top of the fixed housing member 12. The valve 61 is a three-way air valve which is actuated by a cam follower 96 engaging with a cam track forming member 97 which may be supported by means of a bracket 98 on the box cam member 16.

Figure 2:
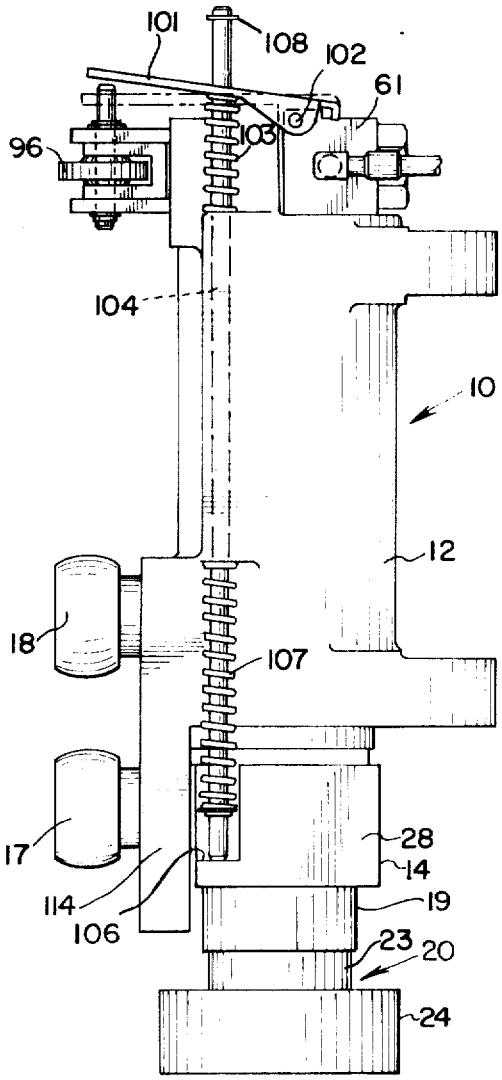
FIG. 2 is a side elevational view showing an adjoining side of the filling head of FIG. 1.

Provision is made for preventing operation of the head 10 in the event no container C is presented below the same for filling. A latch plate 101 (FIGS. 1, 2 and 9) is pivoted at 102 on the valve 61 and normally held in non-operative position by a compression spring 103 on a pulldown rod 104 which is mounted in a guideway 105 in the housing 12 and extends to a position where the lower end rests on an abutment shelf 106 on the lower section 49 of the valve housing A compression spring 107 on the bottom end of the pulldown rod 104 normally urges it in a downward direction to close the latch plate 101. The upper end of the pulldown rod 104 has a stop washer or pin 108 for engaging the top face of the latch plate 101 when the rod 104 is pulled down by the release of the spring 107 which occurs when the lower end 19 of the housing member 14 drops below the container top level by reason of the absence of a container. This latches the valve 61 against delivery of counterpressure and operation of the product feed valve assembly.

Figure 11:
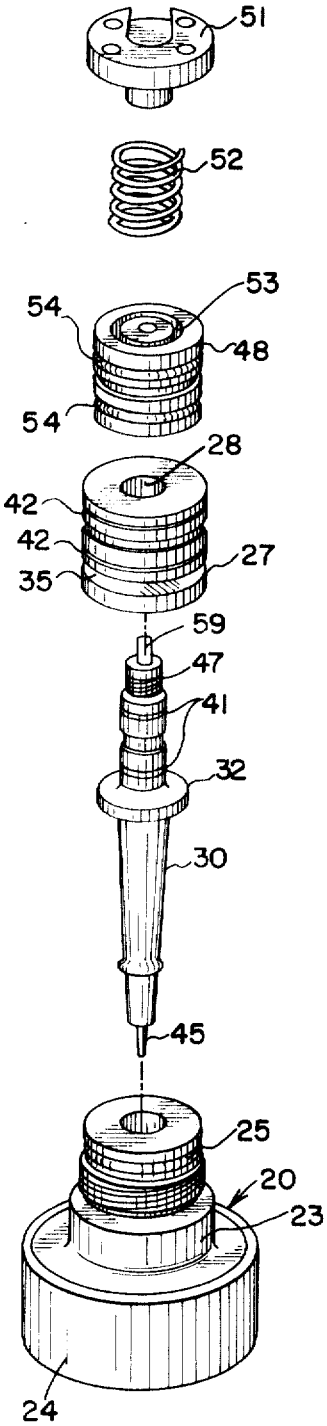
FIG. 11 is an exploded perspective view of the product valve and associated parts removed from the housing.
Figure 10:
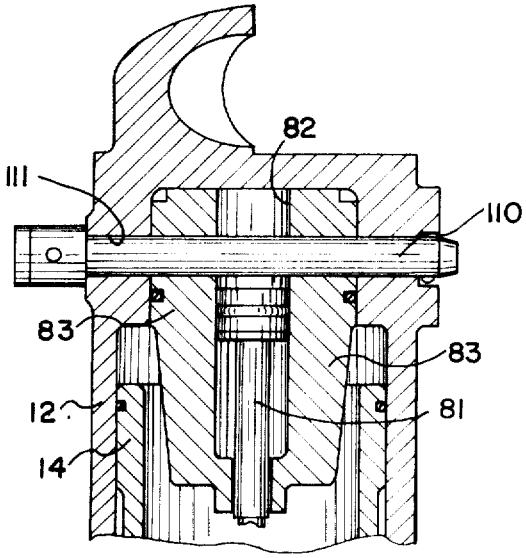
FIG. 10 is a fragmentary sectional view taken on the line 10—10 of FIG. 9.
Figure 6:
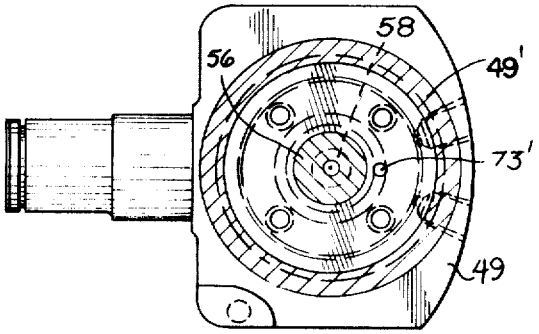
FIG. 6 is a partial cross section taken on the line 6—6 of FIG. 3, to a larger scale and with portions omitted.
Figure 5:
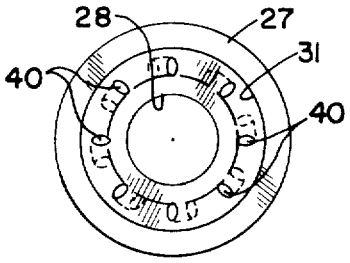
FIG. 5 is a partial cross section taken on the line 5—5 of FIG. 3, to a larger scale showing the bottom face of the product distributor member, the housing and valve body portions being omitted.

As shown in FIG. 11, the valve assembly may be readily removed from the lower housing member 14 for cleaning and replacement by removing first the sealing bell assembly 20 after which the product distributor member 27 and the piston 48 may be withdrawn in an axial direction from the lower housing section 49. The piston 48 and the valve body 30 may then be separated and the valve body 30 removed from the product distributor member 27. The entire inner or lower housing member 14 and associated elements may be removed from the upper housing member 12 by withdrawing the pin 110 (FIGS. 9 and 10) from the co-operating bore 111 which extends through the top side wall portions of the upper or outer housing member 12 and the anchor block 83. The pin 110 normally locks the housing 14 and associated elements in the housing 12. The housing 14 is prevented from turning about its vertical axis by the cross head block 112 mounted on pin 115 extending from member 49 (FIGS. 1 to 3) and which is disposed for vertical reciprocation in a downwardly opening slot 113 in a downward extension 114 of the side wall of the upper housing 12. The cam follower 17 is mounted on the pin 115.

The delivery of counterpressure air through the line 60 is controlled by the three-way valve 61 which is operated by cam 97 in timed relation to the lowering of the housing member 14 to bring the sealing bell assembly 20 into sealing engagement with the mouth of a container C to be filled. The counterpressure air pressure is delivered through a connection 60' (FIG. 9) to the three way valve 61 from a manifold or other source of supply.

Figure 12:
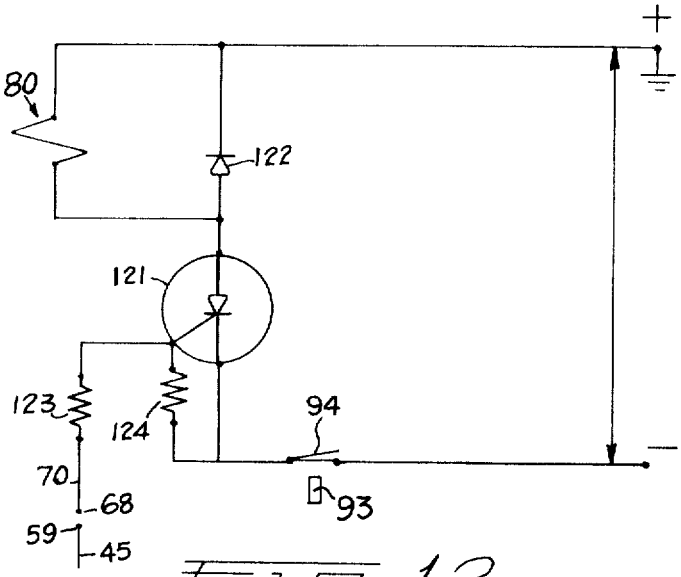
FIG. 12 is a diagrammatic view illustrating the control circuit for the filling head.

The operation of the solenoid valve is controlled as shown by the circuit illustrated in FIG. 12. The 24 volt circuit includes a silicon controlled rectifier (SCR) 121 which is connected in series with the solenoid for the valve 80. A diode 122 is connected across the solenoid for valve 80 to protect the SCR in the inductive circuit formed by the solenoid coil. The rectifier 121 is activated by probe end 59 engaging contact 68 to complete a circuit through line 70 and resistor 123 to the gate of the rectifier for applying a turn-on signal to the gate of the rectifier. The magnitude of the turn-on signal is determined by the resistor 123 and a gate biasing resistor 124 connected between the gate and the rectifier cathode. When the product level reaches the bottom of the probe 45 the circuit is completed which triggers the relay to pass current to the solenoid to open the valve 80 which in turn opens air pressure line 75 and through piston 48 closes product valve 30. The switch 94 is opened by magnet 93 when the housing member 14 is raised by cam 16 to release a container, after filling, which inactivates the circuit and resets it for the next operation. The switch 94 and magnet 93 may be replaced by an externally mounted and mechanically operated switch, as an alternative arrangement.

The product supply line 36 is provided immediately adjacent the inlet port 38 with a flow restrictor device 125 for creating highly turbulent flow conditions. The restrictor device is of a character to create extreme turbulence and a high pressure drop between the elevated pressure of the product and the substantially lower pressure of the counterpressure gas in the container which will result in stabilizing the product for a sufficient length of time to package the product at high speed. A suitable restrictor device may take several different forms, for example, a simple pipe having a relatively small bore compared to its length, or alternatively, a length of relatively thin strip material twisted as shown (FIG. 3) may be used. Another form of restrictor which may be used comprises several smaller diameter tubes arranged side by side in the larger diameter feed line. Still another form of restrictor which may be employed is a commercially available static mixer which consists of a number of elements each of which is a single twist of relatively thin strip material, some having a right hand helix and others a left hand helix, assembled in axially aligned alternate relation in the product feed line which result in alternately swirling the product flowing through it in opposite directions thereby causing extreme turbulence and pressure drop.

In operating the apparatus, an open top container C is positioned beneath sealing bell assembly 20 and the vertically movable valve housing member 14 is lowered by the box cam 16 into sealing engagement with the container top. The counterpressure valve 61 is opened by operation of the cam 97 allowing counter pressure to flow to the line 60, passageways 63, 64, 65 and down through the valve assembly 30 and into the container. As the counter pressure builds up, sufficient force is exerted on the valve assembly 30 and the bottom face of the piston 48 to lift the valve assembly 30 and open the product control valve 30 for flow of product from the line 36 where it has been conditioned by the turbulence member 125 through the passageway 35 into the recess 31 and past the open valve into the guide cone 23. A flow diverting flange 126 near the bottom end of the valve assembly 30 aids in diverting the product outwardly against the wall 26 of the guide cone 23 where it flows in a film down the inside wall of the container. The counter pressure which lifts the piston 48 also engages the tip 59 of the probe 45 with the contact member 57 in the top of the housing 29 and completes the control circuit so that when the level of the fluid in the container reaches the bottom end of the probe 45 the circuit is activated and the valve 80 is opened admitting compressed air above the piston 48 so as to depress the valve assembly 30 and close the product valve. Counter pressure air or gas flows back through the line 60 and the valve 61 as the container is filled so that it does not mix with the product. The counter pressure valve 61 which has remained open is closed by the cam 97 and the housing 14 for the valve assembly is raised by the box cam 16 to release the filled container C. As the housing 14 for the valve assembly reaches its top position the magnet 93 operates the normally closed switch 94 to break or open the control circuit which is then reset when the housing descends onto the next container so allowing the switch 94 to close and activate the relay for another cycle of operation. The compressed air for operating the piston 48 is vented through the passageway 87, leaving the head in condition for repetition of the filling cycle.

With the present arrangement there are no vent tubes or check valves immersed in the product when filling a container and no snifting is required prior to breaking the seal with the container top. Consequently, the filling operation is carried out under dry and hygenic conditions. Also, the filling operation can be carried out with lower counter pressure than in previous filling heads and there is less chance of included air pick-up. The head is lowered on the container for the filling which enables the containers to be handled in a single horizontal plane which is advantageous when a rotary type filling machine is employed where centrifugal force is a factor at high speeds by causing spillage from the open topped containers as they are removed from the filling valves.

A simple means has been provided for the complete cleaning and sterilization of all the ways and parts which are in either the product and counterpressure air circuits. This is accomplished by turning off the counterpressure air supply and substituting for it a high pressure liquid cleaning or sterilizing fluid. Due to the restriction of the probe guide 45' (FIG. 4A) incorporated in the valve stem 30 the liquid will build up pressure under the piston 48 causing it to lift and open the product valve 30 even though no container is sealably engaged with the head. Thus by disconnecting the electric supply to the relay controlling the solenoid valve 80, cleaning or sterilizing liquid will flow at high velocity through all the counterpressure and product ways, scouring and cleaning them.

I claim:

1. In a container filling machine, a filling head which comprises a hollow cylindrical housing having a downwardly opening, upper housing member and a lower housing member in sliding telescoped relation within the upper housing member, a sealing bell mounted on the lower end of said lower housing member which is adapted to be brought into sealing engagement with the mouth of a container positioned in vertical alignment beneath the same when the housing member is lowered, a hollow liquid product distributor mounted in said lower housing member which has a passageway connecting with a product inlet port for directing a liquid product through said lower housing member and into said container, a fluid product supply line connected with said product inlet port, a fluid control valve in said product supply line, a device in said supply line immediately adjacent said inlet port for creating extreme turbulence and high pressure drop, a product feed valve assembly having a body member mounted in said product distributor for axial movement between valve opening and closing positions so as to control the entry of the product into said container, a piston mounted for axial sliding movement in said lower housing member and connected to said feed valve body member, resilient means to normally hold said feed valve body member in valve closing position, means for supplying counter pressure which is operative to pressurize said container and to move said product feed valve to open position, fluid means operative on said piston to move said product feed valve to closed position, a control valve for said piston operating fluid means, and means actuated upon the filling of the container to a predetermined level to operate the control valve for said piston operating fluid means so as to move said product feed valve to closed position.

2. In a container filling machine, a filling head which comprises a hollow cylindrical housing having a downwardly opening lower housing member, a container top engaging sealing bell mounted on the lower end of said lower housing member, said sealing bell being mounted so as to be lowered into sealing engagement with the mouth of a container positioned in vertical alignment beneath the same, a hollow liquid product distributor member mounted in said housing member which has a passageway connecting with an inlet port for directing a liquid product through said housing member and into said container, a fluid product supply line connected with said inlet port, a device in said supply line immediately adjacent said inlet port for creating extreme turbulence and high pressure drop in fluid entering said inlet port, a product feed valve in said product distributor member for movement between valve opening and closing positions so as to control the feed of the product into said container, means for supplying counterpressure which is operative to pressurize said container and open said product feed valve, and means operative to close said product feed valve which is actuated upon the filling of the container to a predetermined level.

3. In a container filling machine, a filling head which comprises a hollow cylindrical housing having a sealing bell mounted in the lower end therof, said sealing bell being mounted for vertical movement so as to be lowered into sealing engagement with the mouth of a container which is positioned in vertical alignment beneath the same, a product distributing member mounted in said housing having a passageway for directing a liquid product into said container, said housing having a product inlet port with the exit side thereof connecting with said passageway, a fluid product supply line connected with the entrance side of said inlet port, means in said product supply line which is located immediately adjacent the entrance side of said inlet port for creating extreme turbulence and high pressure drop in fluid entering said inlet port, a product feed valve associated with said product distributing member for controlling the feed of the product into said container, means for supplying counter pressure through said housing to said container so as to pressurize said container, means connected to said product feed valve which is operative to open said product feed valve when the pressure in said container reaches a predetermined value, and means to automatically operate said feed valve so as to close said product feed valve when the container is filled to a predetermined level.

4. In a container filling machine as set forth in claim 3 wherein said product distributor member is hollow and said product feed valve has a body member which is mounted for sliding movement in said distributor member.

5. In a container filling machine as set forth in claim 3 wherein said product distributor member has an axial bore and said product feed valve comprises a valve body member mounted for sliding movement in said axial bore between valve opening and closing positions.

6. In a container filling machine as set forth in claim 3 wherein said product distributor member has an axial bore, said product feed valve comprises a body member mounted in the bore of said product distributor and said feed valve opening means comprises a fluid operated piston slidably mounted in said housing which is connected to said valve body member, said piston being operable to reciprocate said valve body member for opening and closing said product feed valve.

7. In a container filling machine as set forth in claim 6 wherein said valve body member has an axial bore with a connection to said counter pressure supplying means which forms a passage for entry of counter pressure gas into said container initially and for exit of said gas as the container is filled with the product.

8. In a container filling machine, a filling head which comprises a hollow cylindrical housing having a sealing bell mounted in the lower end thereof which is adapted to be lowered into sealing engagement with the mouth of a container positioned in vertical alignment beneath the same, a product distributing member mounted in said housing, said product distributing member having an axial bore and a passageway for directig a liquid product into said container, said housing having a product inlet port with which said passageway is connected, a fluid product supply line connected with said inlet port, means in said supply line immediately adjacent said inlet port for creating extreme turbulence and high pressure drop in fluid entering said inlet port, a product feed valve associated with said product distributing member for controlling the feed of the product into said container, said product feed valve comprisig a body member mounted in the bore of said product distributor, a fluid operated piston slidably mounted in said housing which is connected to said valve body member, said piston being operable to reciprocate said valve body member for opening and closing said product feed valve, said valve body member having an axial bore and a probe member mounted in said bore which projects at opposite ends thereof and said means to close said product feed valve comprising a fluid supply line connected to said housing for moving said piston, a solenoid operated valve for opening and closing said fluid supply line, an electrical circuit for controlling the solenoid for operating said valve, and said probe forming a part of said circuit for triggering the opening of said solenoid operated valve upon the level of the product reaching said probe.

9. In a container filling machine as set forth in claim 3 wherein said means to open said feed valve is operative in response to the build-up of counter pressure to a predetermined level in said container.

10. In a container filling machine as set forth in claim 3 wherein said product feed valve has an axial bore with a connection to said counter pressure supplying means for passage of counter pressure gas into and out of the container being filled, wherein said means to open said feed valve comprises a piston which is movably mounted in said housing and connected to operate said feed valve for opening and closing of said feed valve, and said means to operate said feed valve to close the same comprises a connection between said piston and the means for supplying counter pressure so that upon build-up of counter pressure in the container to a predetermined level the piston is moved to open said valve for entry of product into said container.

11. In a container filling machine as set forth in claim 3 wherein said means to open said product feed valve when the container is pressurized comprises a fluid operated piston movably mounted in said housing and connected to said product feed valve, a fluid line connected to said housing for supplying fluid to said housing to operate said piston to close said feed valve, a solenoid operated control valve in said fluid line, a circuit controlling the operation of the solenoid for said control valve, and means responsive to the rise to a predetermined level of the product in the container for actuating the solenoid so as to move said piston to a position to close said product feed valve.

12. In a container filling machine as set forth in claim 3 wherein said product feed valve is operative to open and close said product passageway in said product distributing member, and said product feed valve and passageway are arranged so that in the closed positon of the feed valve pressure of the product in the passageway will resist opening movement of said product feed valve.

13. In a container filling machine as set forth in claim 3 wherein said filling head housing comprises telescoping upper and lower cylindrical members and cam means for moving the lower housing member downwardly to bring the sealing bell on the lower end into engagement with the mouth of the container, and wherein said means for supplying counter pressure comprises a counter pressure gas supply line, an inlet portion said lower housing member to the inlet side of which said counter pressure supply line is connected and said product feed valve having an axial passageway communicating with the exit side of said counter pressure inlet port for directing counter pressure gas into said container.

14. In a container filling machine as set forth in claim 3 wherein said means in said supply line for creating extreme turbulence and high pressure drop comprises a restrictor device which provides a reduced cross sectional area in the line for a distance sufficient to cause a high pressure drop for liquid passing through it.

15. A filling head for a filling machine which is operative to deliver a liquid product into a container, said filling head comprising a downwardly opening hollow cylindrical housing having a container engaging and sealing bell on the lower end thereof which is mounted for vertical reciprocation so as to be lowered into sealing engagement with the open top of a container positioned in vertical alignment beneath the same, a product feeding valve assembly mounted in said housing for directing a liquid product into said container and controlling the flow thereof, said housing having a fluid inlet port, a fluid product supply line connected to the inlet side of said inlet ports, said product feeding and flow controlling valve assembly comprising a distributor unit, a valve unit and a fluid operated piston unit mounted in said housing, said distributor unit being held in relatively fixed position in the lower end of said housing, said piston unit being mounted for axial sliding movement above said distributor unit and being connected to said valve unit for moving said valve unit between valve open and valve closed positions so as to control the feed of the product into said container, said housing having an inlet port for counter pressure gas which is located to deliver counter pressure gas into said housing at a point between said distributor unit and said piston unit, and said valve unit having an axial passageway which opens at the top betwen said distributor and piston units and at the bottom leads into said container, means for supplying counter pressure gas to said last mentioned inlet port which is independent of the fluid product supply line so as to pressurize said container and to move said piston unit and associated product feed valve unit to open position for entry of product into said container, and means within said housing which is operative on said piston to move said product feed valve unit to closed position when the container is filled to a predetermined level.

16. A filling head as set forth in claim 15 wherein said cylindrical housing has an inlet port located above said piston and said means to move said piston to close said product feed valve comprises a fluid pressure supply line connected to said inlet port above said piston and a control means which is responsive to a rise of product in said container to a predetermined level.

17. A filling head as set forth in claim 15 wherein there is a spring means which is operative on said piston to move the product valve unit to closed position, the force of said spring means being such that the piston is moved aginst the same upon build-up of counter pressure in the container to a predetermined amount whereby the valve unit is moved to open position.

18. A filling head as set forth in claim 16 wherein said means for supplying counter pressure gas comprises a control valve mounted in fixed relation to said housing, a supply line connected to said control valve, a connection between said control valve and the counter pressure inlet port in said housing and cam means for operating said control valve.

19. A filling head as set forth in claim 18 wherein means is provided for closing and locking said counter pressure control valve upon predetermined downward movement of said container engaging and sealing bell when no container is positioned beneath the same for filling.

20. A filling head for a filling machine which is operative to deliver a liquid product into a container, said filling head comprising a downwardly opening hollow cylindrical housing formed by an upper housing member and a lower housing member in telescoping relation therewith and having a container engaging and sealing bell on the lower end thereof which is adapted to be lowered into sealing engagement with the open top of a container positioned in vertical alignment beneath the same, a product distributing and feeding valve assembly mounted in said housing for directing a liquid product into said container and controlling the flow thereof, said housing having a fluid inlet port, a fluid product supply line connected with said inlet port, said flow controlling valve assembly comprising a distributor unit, a valve unit and a fluid operated piston unit mounted in said housing, said distributor unit being held in relatively fixed position in the lower end of said housing, said piston unit being mounted for axial sliding movement above said distributor unit and being connected to said valve unit for movement between valve open and valve closed positions so as to control the feed of the product into said container, said housing having an inlet port for counter presure gas which is located to deliver counter pressure gas into said housing at a point between said distributor unit and said piston unit, and said valve unit having an axial passageway which opens at the top betwen said distributor and piston units and at the bottom leads into said container, means for supplying counter pressure gas to said last mentioned inlet port so as to pressurize said container and to move said feed valve to open position for entry of product into said container, and means operative on said piston to move said product feed valve to closed position when the container is filled to a predetermined level, said product distributor unit, said valve unit and said piston unit being mounted in said lower housing member, and an anchor block mounted in said upper housing member with a readily removable anchoring pin, and having means for connecting said lower housing member to said anchor block which permits limited reciprocating movement of said lower housing member in an axial direction whereby said lower housing member and the associated product distributing and feeding valve assembly may be released for disassembly by removal of said anchor pin.

21. A filling head as set forth in claim 20 and said means for connecting said lower housing member to said anchor block includes a resilient bumper arrangement for cushioning said lower housing member at the end of the downward movement thereof.

22. In a container filling machine, a filling head which comprises a hollow cylindrical housing having a sealing bell mounted in the lower end thereof which is adapted to be lowered into sealing engagement with the mouth of a container positioned in vertical alignment beneath the same, a product distributing member mounted in said housing having a passageway for directing a liquid product into said container, said housing having a product inlet port with which said product passageway is connected, a fluid product supply line connected with said inlet port, means for closing off said fluid product supply line, a product feed valve associated with said product distributing member for controlling the feed of the product through said product passageway and into said container, said product distributing member having a passageway for a counterpressure gas, said housing having a counterpressure inlet port which is in communication with the counterpressure passageway in said product distributing member, a counterpressure gas supply line connected to said counterpressure inlet port for supplying counterpressure gas through the passageway in said product distributing member to pressurize said container, means associated with said counterpressure gas supply line for connecting said line to a supply line for a cleaning fluid and a control therefor so as to enable a cleaning fluid under pressure to be substituted for the counterpressure gas, to open said product feed valve when fluid pressure in said counterpressure passageway builds up to a predetermined point, and flow restricting means in said counterpressure passageway to cause fluid pressure to build up to feed valve opening pressure upon closing the counterpressure and product supply lines and opening the cleaning fluid line even when no container is in sealing relation with said sealing bell, so as to permit circulation of cleaning fluid throughout said filling head.

23. A method of filling a container with a carbonated liquid product which comprises engaging the mouth of the container in sealing relation with a filling head which has a product feed valve therein, feeding a counterpressure gas into the mouth of the container to pressurize the container, feeding the pressurized product through a supply line which is connected to the filling head, creating a condition of extreme turbulence in the fluid product while in the supply line just prior to entry of the fluid product into the filling head and operating the product feed valve to control the volume of fluid product fed into the container while venting the counter pressure gas.

24. A method of filling a container as set forth in claim 23 which includes controlling the operation of the product feed valve automatically by rise in counter pressure in the container to a predetermined point to open said valve and by rise in level of the product in the container to a predetermined level to close said valve.

*25. Apparatus for filling a container with a carbonated liquid product comprising a filling head having sealing means thereon for forming a seal with a container to be filled, said filling head having a product supply line connected thereto for supplying a carbonated liquid to said filling head for delivery thereby to a container, and means in said product supply line immediately adjacent said filling head for creating extreme turbulence and high pressure drop in carbonated liquid entering said filling head.*

*26. The apparatus of claim 25 together with means for supplying counterpressure gas to a container being filled in advance of discharge of carbonated liquid thereinto to pressurize the container.*

*27. The apparatus of claim 25 wherein said filling head includes product feed valve means for controlling the discharge of carbonated liquid from said filling head into a container, said product feed valve means including actuator means operable by counterpressure gas within said filling head to move said product feed valve means to an open product discharging position.*

*28. The apparatus of claim 27 wherein said counterpressure gas pressure is less than the pressure of carbonated liquid supplied to said filling head wherein there is a backflow of counterpressure gas out of a container being filled as carbonated liquid fills the container.*

*29. The apparatus of claim 27 together with control means for effecting closing of said product feed valve, said control means including a sensor projecting from said filling head and in a position for contacting liquid in a container being filled at a predetermined level thereof.*

*30. A method of filling a container with a carbonated liquid product which comprises engaging the container in sealing relation with a filling head, feeding the carbonated liquid product under pressure through a supply line connected to the filling head, and creating a condition of extreme turbulence in the carbonated liquid product while in the supply line just prior to entry of the carbonated liquid product into the filling head.*

*31. The method of claim 30 wherein a counterpressure gas is fed into the container to pressurize the container in advance of feeding the carbonated liquid product into the container.*

References Cited

The following references, cited by the Examiner, are of record in the patented file of this patent or the original patent.

UNITED STATES PATENTS

| | | | |
|---|---|---|---|
| 2,605,949 | 8/1952 | Stern | 141—39 |
| 2,896,674 | 7/1959 | Day et al. | 141—39 |
| 3,211,192 | 10/1965 | Van Zyl | 141—39 |
| 3,516,455 | 6/1970 | Carter | 141—90 |

HOUSTON S. BELL Jr., Primary Examiner

U.S. Cl. X.R.

137—170.1; 141—40, 59, 91, 140, 302